(12) United States Patent
Frey

(10) Patent No.: US 11,333,143 B2
(45) Date of Patent: May 17, 2022

(54) OSCILLATING DISPLACEMENT PUMP HAVING AN ELECTRODYNAMIC DRIVE AND METHOD FOR OPERATION THEREOF

(71) Applicant: KNF Flodos AG, Sursee (CH)

(72) Inventor: Raphael Frey, Lucerne (CH)

(73) Assignee: KNF Flodos AG, Sursee (CH)

( * ) Notice: Subject to any disclaimer, the term of this patent is extended or adjusted under 35 U.S.C. 154(b) by 629 days.

(21) Appl. No.: 16/319,523

(22) PCT Filed: Jul. 11, 2017

(86) PCT No.: PCT/EP2017/000817
§ 371 (c)(1),
(2) Date: Jan. 22, 2019

(87) PCT Pub. No.: WO2018/015000
PCT Pub. Date: Jan. 25, 2018

(65) Prior Publication Data
US 2021/0277882 A1    Sep. 9, 2021

(30) Foreign Application Priority Data

Jul. 22, 2016 (DE) .......................... 102016008783.8

(51) Int. Cl.
*F04B 43/04* (2006.01)
*F04B 41/06* (2006.01)
(Continued)

(52) U.S. Cl.
CPC ............ *F04B 43/04* (2013.01); *F04B 17/042* (2013.01); *F04B 41/06* (2013.01); *F04B 43/026* (2013.01);
(Continued)

(58) Field of Classification Search
CPC ........ F04B 43/04; F04B 17/042; F04B 17/04; F04B 17/044; F04B 2201/0201;
(Continued)

(56) References Cited

U.S. PATENT DOCUMENTS 3,411,704 A   11/1968   Hilgert et al.
5,641,270 A   6/1997    Sgourakes et al.
(Continued)

FOREIGN PATENT DOCUMENTS

CA   2873660   11/2013
DE   1613167   1/1971
(Continued)

OTHER PUBLICATIONS

Jufer, M. Traité d'électricité, vol. IX, Electromécanique, Presses polytechniques et universitaires romandes, 2004, pp. 123 to 129.

*Primary Examiner* — Dominick L Plakkoottam
(74) *Attorney, Agent, or Firm* — Volpe Koenig

(57) ABSTRACT

An oscillating positive displacement pump with at least one mobile part arranged to be movable relative to a fixed part. The mobile part is driven and drives a displacement element of the positive displacement pump. An electrodynamic drive is provided as a drive, on which a plurality of coils and permanent magnets are provided that are arranged on the mobile part of the drive respectively, and at least one guide member is provided on the drive, which allows the mobile part to move only along a degree of translation freedom. The positive displacement pump is designed as a diaphragm pump, which is associated with a measurement and control unit with a data storage and data processor, which processes a position signal of the mobile part and the strength of the drive current as a measured and/or control variable. An arrangement of a plurality of such positive displacement (Continued)

pumps and a method of operating at least one such oscillating positive displacement pump are also provided.

27 Claims, 3 Drawing Sheets

(51) Int. Cl.
| | |
|---|---|
| H02K 11/215 | (2016.01) |
| H02K 33/16 | (2006.01) |
| F04B 17/04 | (2006.01) |
| F04B 49/06 | (2006.01) |
| F04B 43/02 | (2006.01) |

(52) U.S. Cl.
CPC .......... F04B 49/065 (2013.01); H02K 11/215 (2016.01); H02K 33/16 (2013.01)

(58) Field of Classification Search
CPC ............ F04B 2201/0202; F04B 43/026; F04B 45/043; F04B 45/047; F04B 49/065; G01N 2030/326; H02K 11/215; H02K 29/08; H02K 41/031; H02P 6/006
See application file for complete search history.

(56) References Cited

U.S. PATENT DOCUMENTS

| | | |
|---|---|---|
| 6,203,288 B1 | 3/2001 | Kottke |
| 8,143,750 B2 | 3/2012 | Aso et al. |
| 8,366,414 B2 * | 2/2013 | Kaufmann ............... F04B 17/04 417/412 |
| 9,050,408 B2 * | 6/2015 | Rochat .............. A61M 5/14224 |
| 9,341,172 B2 * | 5/2016 | Kohli ....................... F04B 43/04 |
| 9,488,166 B2 * | 11/2016 | Ishii ........................ F04B 43/04 |
| 2007/0040454 A1 * | 2/2007 | Freudenberger ........ F04B 43/04 310/12.04 |
| 2012/0098469 A1 | 4/2012 | Takeuchi |
| 2014/0023532 A1 * | 1/2014 | Ishii ...................... F04B 45/047 417/413.1 |
| 2017/0298919 A1 * | 10/2017 | West ....................... F04B 43/04 |

FOREIGN PATENT DOCUMENTS

| | | |
|---|---|---|
| DE | 60024154 | 8/2006 |
| DE | 112006002332 | 7/2008 |
| DE | 102008030633 | 12/2009 |
| EP | 1757809 | 2/2007 |
| JP | S58127553 | 7/1983 |
| JP | 6270673 | 4/1987 |
| JP | H11201035 | 7/1999 |
| JP | 2000180364 | 6/2000 |
| JP | 2004364399 | 12/2004 |
| JP | 2006244860 | 9/2006 |
| JP | 2010286010 | 12/2010 |
| JP | 2013148083 | 8/2013 |
| JP | 2016006345 | 1/2016 |
| WO | 2013171585 | 11/2013 |
| WO | 201528384 | 3/2015 |

* cited by examiner

OSCILLATING DISPLACEMENT PUMP HAVING AN ELECTRODYNAMIC DRIVE AND METHOD FOR OPERATION THEREOF

BACKGROUND

The invention relates to an oscillating positive displacement pump with at least one mobile part, which is arranged to be movable relative to a fixed part and driven by a drive, and which drives a displacement element of the positive displacement pump itself, wherein the drive has a plurality of energized coils and permanent magnets and, respectively, the plurality of coils or the plurality of permanent magnets are arranged on the mobile part of the drive, wherein magnetic fields with an alternating direction flow through the plurality of energized coils with alternating winding directions, said magnetic fields being able to be generated or being generated by a plurality of permanent magnets by an alternating polarity and being conducted or being capable of being conducted into the coils via the magnetic poles, wherein each energized coil contributes a summable contribution to the force arising by this in the axial direction of the drive, wherein, on the drive, at least one guide member is provided, which allows the mobile part to move along only one degree of translation freedom and wherein a measurement and control unit with a data storage and data processor is associated with the positive displacement pump, which processes a position signal of the mobile part and the strength of the drive current as a measured and/or control variable. Furthermore, the invention relates to an arrangement of a plurality of such positive displacement pumps and a method for operating a pump system with at least one such positive displacement pump.

Electrodynamic drives are known in principle, wherein electrical drives, for example, can be classified into different categories according to M. Jufer (Traité d'électricité, Volume IX, Electromécanique, Presses polytechniques et universitaires romandes, 2004). On the one hand, there is a so-called reluctance drive, which is also, in part, referred to as an electromagnetic drive and has a coil with an armature and stator but does not have any permanent magnets and, on the other hand, there is a so-called electrodynamic drive with a permanent magnet and a coil where Lorentz force comes into effect.

With regard to this, from the most recent background art, for example from CA 2 873 660 A1, a diaphragm pump designed for vacuum applications is already known, which can only handle pressure differences lower than 1 bar due to this circumstance. Such low pressure differences can be implemented using the single-stage drive shown there; if the pressure differences become greater, the dimensions of the drive will exceed those of the pump head in such a way that manageability suffers as a result. Moreover, using the pump known from this disclosure, it is not possible to monitor the stroke of the drive so that no regulation can take place with regard to its position or speed.

Furthermore, from EP 1 757 809 B1, a magnetic dosing pump is known, which forms a reluctance drive with a spring-return mechanism in terms of what is described above and where its armature position follows a reference value specification by a control circuit. Thereby, this diaphragm pump with a stroke sensor only moves electrically in one direction of the stroke while the movement in the other, opposite direction, is driven by a return spring. A return spring is necessary because no force reversal is possible with a reluctance drive by current reversal. In the case of a reluctance drive, based on principle a drive with a high level of induction results, meaning a high "magnetic inertia", whereby no good energy efficiency and also no good regulation dynamics can be achieved. Thereby, the non-linear correlation between the force and the current in the case of the reluctance drive is disadvantageous and costly on a control technological level. Furthermore, the pump also has deficits with respect to handling in that the fluid path cannot be sealed in the direction of flow if the pump is de-energized.

An oscillating positive displacement pump is already known from DE 600 24 154 T2 with a polarized reluctance drive, the armature of which is made of a plurality of permanent magnets and magnetic soft pole pieces arranged in between. This armature is encompassed by a stator, which is constructed from a plurality of coil-shaped wire windings and magnetic soft pole pieces arranged in between. In this stator, a linearly moving magnetic field is generated, through which the armature is moved back and forth in opposing linear directions. On the one armature end, a piston is provided as a displacement element, which protrudes into a pump space.

The use of similar drives is previously known from DE 10 2008 030 633 B4 and JP S 58 127 553, however in connection with free-piston engines. A pressure and/or a position detection of the displacement element is not provided in the case of the most recent background art previously known in these three aforementioned publications.

From DE 11 2006 002 332 T5 and US 2012/0098469 A1, linear-drive units are already known that have an electrodynamic drive. The use of these previously known linear-drive units in connection with an oscillating positive displacement pump and, in particular, in connection with a diaphragm pump is, however, not provided in these publications.

From DE 1 613 167 A, a diaphragm compressor is already known, which has a reluctance drive with at least one drive coil. This at least one drive coil is associated with a magnetic device, which has a movable armature, which is connected to the working diaphragm of the previously known diaphragm compressor. The armature and the working diaphragm connected to it are spring-preloaded in a specified position and energizing of the coils causes a movement of the armature into a second position. The drive coils can be energized by impulses in order to make an oscillation movement of the armature in the previously known diaphragm compressor possible. In response to an adjustment of a servo-valve and of a signal coil, which is wound around the magnetic construction, the drive coils are energized in order to induce and maintain an intermittent operation of the diaphragm compressor that takes place at full stroke under load conditions. The servo-valve comprises an input-signal device, which can control the spacing of a leak-aperture cover provided in the servo-valve with reference to an outlet nozzle. A variable resistance is set by the position of the leak-aperture cover and switched into the energization control circuit for the electromagnetic compressor. A variable resistance allows the cover and the connection end of the nozzle to form resistance contacts, wherein the resistance is determined by the spacing and the pressure application of the cover from or on the nozzle. The signal coil wound on the magnetic construction of the electromagnetic drive is connected in such a way that it preloads a cutoff transistor or a cutoff element in the drive control circuit in such a way that a cutoff of the energy to the drive coils is managed in accordance with the movement of the armature. By this, the cutoff point with reference to the armature position during the strokes can be directly changed with the load of the diaphragm compressor, meaning with the initial pressure, against which it operates and which is, in itself, caused by the servo-valve. In the case of small loads, the armature can accelerate more quickly and, accordingly, can create a quicker increase of the signal and a stronger signal than the one that is caused if the initial load increases. As a result, the cutoff voltage appears, which is generated in the signal coil and applied to the control circuit, during the armature movement earlier in the case of low pressures or small load levels than is the case with higher loads and associated high pressures. The sensor used in the diaphragm compressor previously known from DE 1 613 167 A thereby only serves to switch off the current before the armature strikes, thereby reducing operating noise arising during the operation of the previously known diaphragm compressor.

From U.S. Pat. No. 5,641,270, a resilient high-precision pump is previously known, which has a magnetostrictive drive. In this magnetostrictive drive, materials are used, which deform if they are flowed through by a magnetic field. The magnetostrictive drive used in U.S. Pat. No. 5,641,270 also considerably differs with regard to its design and functionality from the electrodynamic drive used according to the invention.

A diaphragm pump is known already from US 2014/0023532 A1, the diaphragm of which is moved with the aid of a polarized reluctance drive. While, in the case of the electrodynamic drive used according to the invention, the magnetic field of the permanent magnets flows directly through the coils, in the case of the polarized reluctance drive used in US 2014/0023532 A1, the magnetic field of the permanent magnets does not flow through the coils, but the magnetic field flows through the soft magnetic materials, which surround the coils.

SUMMARY

The object of the present invention is therefore to create an oscillating pump of the aforementioned type where the stroke speed, position or acceleration can be regulated in a simple way. Thereby, the positive displacement pump according to the invention should be characterized by a very direct response behavior as well as an energy-efficient operation.

According to the invention, the solution to this task entails that the positive displacement pump is designed as a diaphragm pump and its displacement element is designed as a diaphragm and that the drive is designed as an electrodynamic drive free of pole pieces on the coil.

The present invention provides that the positive displacement pump according to the invention is designed as a diaphragm pump and its displacement element is designed as a diaphragm. In order to be able to drive the displacement element by the mobile part of the positive displacement pump, according to the invention, a dynamic drive, which is pole-piece-free on the coil, is provided where the Lorentz force acts directly between the magnetic fields of the permanent magnets and the energized coils. This acts much more directly than the magnetic force in the case of reluctance magnetic drives from the most recent background art because the ferromagnetic circuit acts in a delaying manner in the case of the reluctance drive. Therefore, a pump with an electrodynamic drive can be operated in a quicker, more dynamic and also more precise manner. In the case of the electrodynamic drive, by a reversed current direction, the direction of the force can be reversed by reversing the polarity of the voltage, meaning the drive can be actively operated in both directions and, if required, also be slowed down. This is not possible with a reluctance drive. In order to be able to regulate the stroke position, speed or acceleration in the case of the positive displacement pump according to the invention designed as a diaphragm pump, according to the invention, it is provided that a measurement and control unit with a data storage and data processor is associated with the diaphragm pump according to the invention, which processes a position signal of the mobile part and the strength of the drive current as a measured and/or control variable. Using the described electrodynamic drive and the position regulation system, the coils are operated with just as much or just as little current as is required for reaching or maintaining a certain stroke position. By this and by the linear correlation of drive current and drive force, the entire drive of the diaphragm pump according to the invention can be regulated in a simpler and more dynamic manner and, additionally, in a more efficient manner than is the case with conventional reluctance drives.

A plurality of coils and permanent magnets are provided on the drive of the positive displacement pump according to the invention and the plurality of coils and permanent magnets are respectively arranged on the mobile part of the drive. Thereby, the plurality of energized coils with alternating winding directions are flowed through with magnetic fields that alternate in direction, which can be generated or are generated by a plurality of permanent magnets by alternating polarity and can be guided or are guided into the coils via the magnetic poles, wherein each energized coil makes a summable contribution to the force generated by this in the axial direction of the drive.

Thereby, in the case of one embodiment of the pump according to the invention, the movement of the mobile part can be favorably limited by a guide member to only one degree of translation freedom, which is designed as a sliding guide or as a spring element. Thereby, the sliding guide can be designed both as a slide bearing as well as a rail or a dovetail guide. Different arrangements of springs are also conceivable as spring elements, for example, as a flat spring.

A simple construction of the pump or its drive is thereby implemented by an embodiment of the pump where a linear body and a mounting are arranged toward each other in a movable manner so that a preferred development of the pump can here consist of the linear body being designed as a rod and/or the mounting being designed as a part, which has a shell-shaped cross section, into the inner space of which the rod grips.

In another favorable embodiment of the pump, the linear body can be provided with the permanent magnets with an alternating polarity and the shell-shaped part can be provided with the plurality of coils so that the coils and the permanent magnets are provided on the drive in a constellation moving against each other.

Thereby, in expedient embodiments of the drive, both the linear body can form the mobile part and the mounting can form the fixed part or also vice versa, the linear body can form the fixed part and the mounting can form the mobile part.

Thereby, due to decreased vibration levels, the mobile part driving a displacement element of the pump for example the mounting can preferably be provided with coils so that less mass must be moved than is the case with permanent magnets being moved.

A simple construction of the pump according to the invention consisting of the fewest parts possible can be achieved by a design where the fixed part is permanently connected to a housing of the drive or is made out of a single piece with this.

In order to permit the mobile part to appropriately move only along a degree of translation freedom, in the case of an expedient further embodiment, the mobile part and the fixed part can be connected or are connected to each other by the at least one guide member. The at least one guide member thereby favorably forms a linear guide without sliding surfaces and is therefore friction-free and durable.

In the case of another expedient further embodiment, which increases the linearity of the guide, a plurality of guide members, particularly, two guide members can be provided, which connect regions of the mobile and the fixed part facing each other with each other. Thereby, the regions facing each other can, for example, be end regions of the respective parts. In the case of a thrust or a connecting rod as a mobile part, both free ends of the mobile part (the rod) can thus be connected to the fixed part by at least one guide member respectively.

Thereby, an expedient further embodiment can include integrating one of the guide members into the displacement element and of forming the displacement element directly by a guide member, whereby a compact, inexpensive and wear-free guide of the mobile part is formed. The diaphragm of the pump as a displacement element is then a guide member of the drive at the same time.

In another embodiment of the pump, which is favorable due to the fact that it is space-saving and offers increased safety, at least one of the guide members can be designed as a flat spring so that, in the case of pre-tensioning the springs concerned, the movable part can also be moved, if required, without a drive into a desired stop position. Thereby, the flat spring concerned can be designed as a metal shaped part, which is punched out of spring steel strip.

Accordingly, in another preferred embodiment, the at least one guide member can be provided with a preload, which is applied to the displacement element in the case of a de-energized drive in such a way that an inlet and/or an outlet opening of a working chamber of the pump is sealed. By this, the fluid path can be reliably sealed during downtime of the pump by the preload force of the spring and also, no fluid can flow through the passive valves of the pump in the case of a positive pressure gradient.

In the case of another embodiment of the pump exhibiting the same effect, on the drive, for example, between the housing and the mobile part, a spring is provided, which impinges the mobile part, whereby the displacement element seals an inlet and/or outlet opening of a working chamber of the pump in the case of a de-energized drive. In this embodiment however, the spring is not a guide member of the drive in the sense of what is described above, even if the movement caused by the spring can be guided to a certain extent.

In order to make a slim construction of the drive possible, the lateral extension of which is favorably oriented approximately on the base surface of the pump head, in another embodiment of the pump, the plurality of coils and permanent magnets can be arranged in a row respectively, in particular, one after another. Thereby, in a row, one after another in parallel, or coaxial to the longitudinal extension of the drive is meant in such a way that the permanent magnets form strong magnetic poles for instance where homopolar ends of the magnets lie opposite to each other within the row concerned. In this way, the force that can be exerted on the mobile part can be increased by connecting the magnets and the coils in series on the parts that are movable toward one another.

A favorable low-loss power transmission makes a good coupling of the magnets to the energized coils possible, which is successful if the coils arranged on the mobile or on the fixed part comprise an annular cross section, meaning the coils are wound in an annular manner. The coils wound on a circumference of the part concerned have alternating winding directions, which equally contribute to the formation of the magnetic poles previously mentioned.

Thereby, another favorable embodiment of the pump according to the invention where an electrodynamic drive is to be appropriately arranged with the pump in a connectible manner can comprise an essentially cylindrical or square pump body, one end region of which is provided with an inlet and an outlet for the fluid to be transported and which then continues into a housing receiving the drive in an essentially flush manner on the end region.

A favorable further embodiment can provide the measurement and control unit in a programmable manner in such a way that the pump with its drive processes similar or different work steps with regard to aspiration and discharge of the medium to be transported, meaning so-called profiles.

Here, preferably, for example, path and/or speed profiles can be run. In the former, for example, the full stroke can be aspired, however, then, the fluid corresponding to the stroke volume can be discharged by this into a plurality of partial volumes so that the pressure stroke is gradually completed in a plurality of steps. In the case of the latter, it is, for example, conceivable that, in the case of the aspiration stroke, the speed is set in such a way, that, for example for viscous media, a slow aspiration takes place or otherwise, depending on the requirement of the respective application, the discharge speed of the medium is set by an adjustable pressure-stroke speed.

A preferred embodiment according to the invention provides for the pump according to the invention to be designed as a diaphragm pump and, in particular, to be designed as a diaphragm fluid pump.

Thereby, an aspect of the invention also extends to a solution where an arrangement of a plurality of pumps form a configuration for a pump system where large volumes of media to be transported should be conveyed. The plurality of pumps with their drives can be operated in parallel; the plurality of inlets and outlets of the corresponding plurality of operating spaces of the pumps are connected to each other in parallel respectively.

In the case of the aforementioned method, the solution according to the invention entails that a measurement and control unit with a data storage and a data processor is associated with the at least one positive displacement pump, and that the development of the electrical current over time and the position of the drive of the at least one positive displacement pump is detected as a measured variable and evaluated to determine the pressure in a working chamber of the system associated with the at least one pump and the pressure is determined and saved with the calculable transmission behavior of the displacement element. Thereby, the method achieving the task is characterized by the features that, in order to determine the pressure in a working chamber of the system associated with the at least one pump, the development of the electric current of the drive over time and the position of the mobile part of the at least one pump is detected as a measured variable and the pressure in the working chamber of the pump is determined using the calculable transmission behavior of the displacement element. Thereby, the circumstance is taken advantage of that, in the case of electrodynamic drives, the generated force is proportional to the current generated in the electrical coils to a good extent. Therefore, in the case of a directly constant transfer (e.g. in the case of a piston pump) or a known, or else, at least describable transfer of the pressure from the working chamber of the pump to the drive based on the force or the electrical drive current and the position of the mobile part, the pressure in the working chamber of the pump can be determined. In this sense, the displacement element of the pump also forms a pressure sensor.

The method according to the invention provides for the detection of the current and the position of the drive of the at least one positive displacement pump as a measured variable. The pressure in the working chamber of the at least one positive displacement pump is determined from the known transmission behavior by the parameters 'position' and 'current (force)'. Thereby, the transmission behavior of the diaphragm can be approximated by a fully clamped ring plate so that, in the case of neglecting the shear forces as well as smaller displacements, equations of the first order can be used. In these equations, the measured force and the position of the rigid diaphragm part can be used in order to then deduce the pressure in the working chamber from this.

Thereby, a preferred further embodiment according to the invention provides that the transmission behavior of the diaphragm is described using the formula $p=c_1 F+c_2 x$, wherein p is the pressure in the working chamber, F is the connecting-rod force, x is the position of the drive and $c_1$ and $c_2$ are constants that are dependent on the geometry and the material characteristics of the diaphragm. These constants can be determined from the outer clamping radius a as well as the inner clamping radius b of the diaphragm, the diaphragm thickness h, the E-modulus of the material used for the working diaphragm and from the Poisson's ratio nu.

The transmission behavior of the diaphragm can be determined for a number of positions and load cases by numerical calculation methods, for example, by the finite-element or finite-difference method and stored as reference values in a table. Thereby, the transmission behavior of the diaphragm can be numerically described using the formula $p=f(F,x)$. Using the values stored in the table or using interpolations lying in between, the 'right' transmission behavior of the working diaphragm can then respectively be determined in order to calculate the pressure.

In a favorable variant of the method, the pressure determination can individually occur in both transfer directions of the at least one pump, meaning a determination of the negative pressure in the case of the aspiration movement of the pump and of the positive pressure in the case of an ejection movement. In a further embodiment, the pressure of a plurality of pumps associated with a pump system can be determined, and thereby advantageously be capable of being regulated for each of the pumps individually, wherein this can be implemented by a joint control device, for example, in the form of the measurement and control unit.

Since each of the pumps used in a pump system can already have a different transmission behavior depending on the component tolerances, in terms of a pressure determination that is as flawless as possible, it is of advantage if, in the case of a variant of the method, the transmission behavior of the pressure on the drive is determined for each pump before its use in the pump system and is saved in one of the data storages associated with the measurement and control unit and kept in a retrievable manner.

Thereby, in a variant, the pump system with the measurement and control unit forms a control circuit, which is operated with the drive current strength as a measured variable and with the pressure of the working chamber as a control variable.

In favorable variants, via the measurement and control unit, the pump system with the regulation can compensate for the developments of the pressure deviating from the saved transmission profiles by manipulating the drive. In this way, for example, a pressure regulation can take place at the inlet or the outlet of the pump, which maintains the pressure by the drive within a value window between two manipulable extreme values, a minimum and a maximum value, or the pump or pumps can be provided with a pressure cutoff in the case of exceeding extreme values. In an expedient manner, for example, the drive can be switched off by the measurement and control unit when the extreme values for a selectable time interval have been exceeded.

In the case of other favorable variants, by the method according to the invention, cavitation or degassing due to a negative pressure of the fluid in the pump can be detected and/or avoided, or compensated for the purpose of constant stroke volumes of the stroke in the case of varying counter pressure.

In order to determine fluid data, such as its viscosity, and/or characteristics of a connected pipe system, such as its flow resistance, its elastic behavior or damping behavior by such a pump system, another variant of the method according to the invention can provide for the detection via the measurement and control unit of the progression of the pressure over time for different speeds at the inlet and outlet of the medium to be transported from the working chamber and, by an evaluation unit, provide for the determination of parameters of the medium and/or of at least one transport device from this progression over time.

Based on the parameters determined, another variant of the pump system thereby manipulates parameters of the drive of the pump automatically by these in terms of a self-learning effect, which means that, based on the determined characteristics of the fluid and/or the fluid lines (meaning their flow resistance, elastic behavior and/or damping behavior), adaptive path or speed profiles are run on the pump(s).

Thereby, overall, a pump system can be implemented, in which pressure, volume or other parameters can be designed in a controllable manner by a user via the measurement and control unit.

BRIEF DESCRIPTION OF THE DRAWINGS

The pump according to the invention with an associated drive will be explained in more detail below based on the exemplary embodiments in the drawing. In a partly schematic illustration, the figures show.

DETAILED DESCRIPTION

Figure 1:
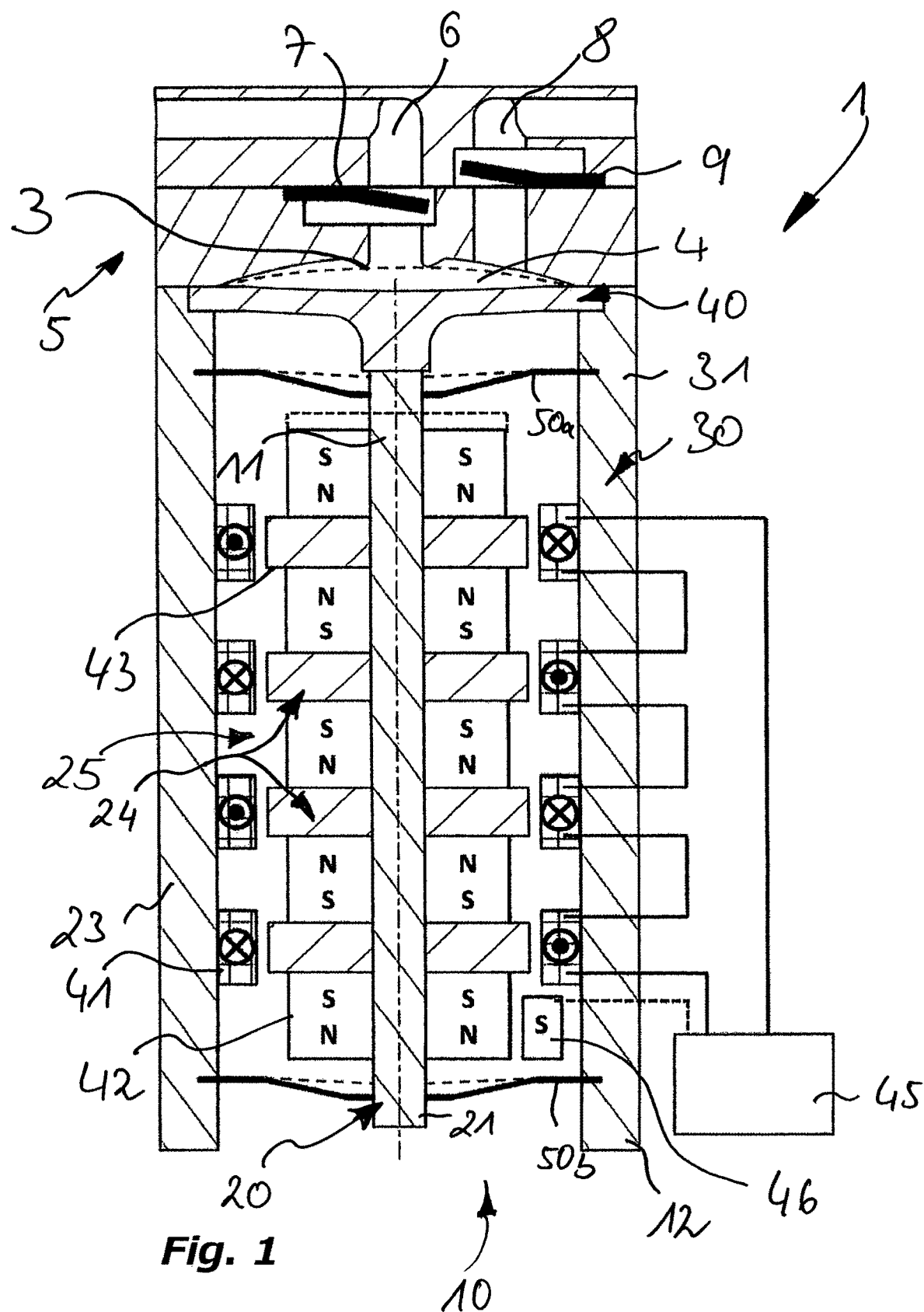
FIG. 1 a sectional lateral view of a first exemplary embodiment of a pump according to the invention with a fixed and a mobile part on its drive, wherein the coils are arranged on the fixed part.
Figure 2:
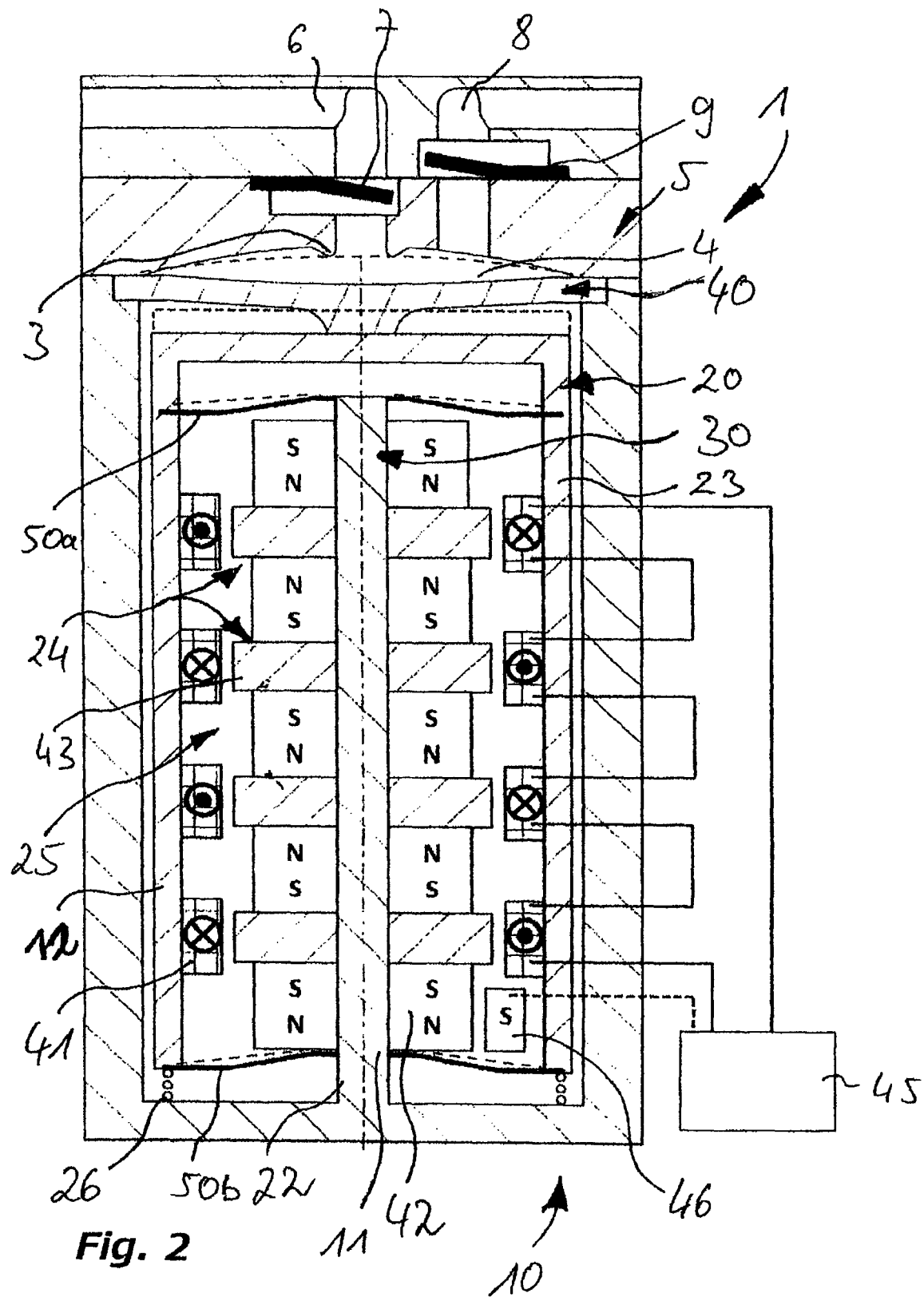
FIG. 2 a sectional lateral view of another exemplary embodiment of a pump according to the invention with a fixed and a mobile part on its drive, wherein the coils are arranged on the mobile part.

In FIGS. 1 and 2, a pump, which is indicated in its entirety with reference number 1 can respectively be seen. This pump 1 designed as a positive displacement pump comprises a pump head 5, by which an inlet 6 and an outlet 8 with the associated valves 7 and 9 are recognized. The pump 1 is provided with a mobile part 20, which is arranged in a movable manner relative to a fixed part 30 formed by a housing 31. The mobile part 20 in FIG. 1 is thereby a connecting rod 21, which is driven by the drive 10. Thereby, the driven mobile part 20 itself drives a displacement element 40 of the pump 1, wherein the drive 10 is formed by an electrodynamic drive. A plurality of coils 41 and permanent magnets 42 are provided on the drive 10, wherein the plurality of coils 41 (FIG. 2) or the plurality of permanent magnets 42 (FIG. 1) are respectively arranged on the mobile part 20 of the drive 10. Furthermore, two guide members 50a, 50b are respectively provided on the drives 10 in FIGS. 1 and 2, which allow the respective mobile part 20 to move along only one degree of translation freedom, which extends in the illustrations of FIGS. 1 and 2 along a vertical axis lying on the level of the viewer.

Furthermore, it can be recognized that the drive 10 comprises a linear body 11 and a mounting 12, which are arranged in a movable manner against each other, wherein the linear body 11 is designed as a connecting rod 21 (FIG. 1) or as a rod 22 (FIG. 2) and the mounting 12 is designed as a shell-shaped part 23, into the interior space of which the connecting rod 21/rod 22 projects. Furthermore, it can be seen in FIGS. 1 and 2 that the linear body 11 is provided with the permanent magnets 42 with an alternating polarity and the shell-shaped part 23 is provided with the plurality of coils 41. Thereby, the permanent magnets 42 are arranged in a row over the primary part of the length of the linear body 11 in such a way that pronounced poles 43 result due to magnet ends of the same polarization lying opposite adjacent to one another. The poles 43 concerned are encompassed by annularly wound coils 41 with an alternating winding direction, which are arranged on the mounting 12.

The magnetic return occurs either via the shell-shaped part 23 or the housing 31, which, in this case, are preferably made out of a ferromagnetic material.

The fundamental difference between FIGS. 1 and 2 lies in the fact that, on the one hand, in FIG. 1, the linear body is formed by the connecting rod, which is the mobile part, and is encompassed by the shell-shaped part 23 as a fixed part, which therefore forms the mounting 12 while, on the other hand, in FIG. 2, the linear part via the rod 22 forms the fixed part 30 and the mounting 12 with the shell-shaped part 23 forms the mobile part 20. Accordingly, it behaves so that the linear body 11 forms the mobile part 20 and the mounting 12 forms the fixed part 30 or vice versa. Thereby, the fixed part 30 is fixedly connected to a housing 31 of the drive 10 or designed as a single piece with this; in the case of FIG. 1, the fixed part 30 is a part of the housing 31; in FIG. 2, it is fixedly connected to the housing as a rod 22. In both cases, the linear body 11 protrudes into the inside of the shell-shaped part 23, meaning in to the clear cross section 25 formed by the mounting 12.

Figure 3:
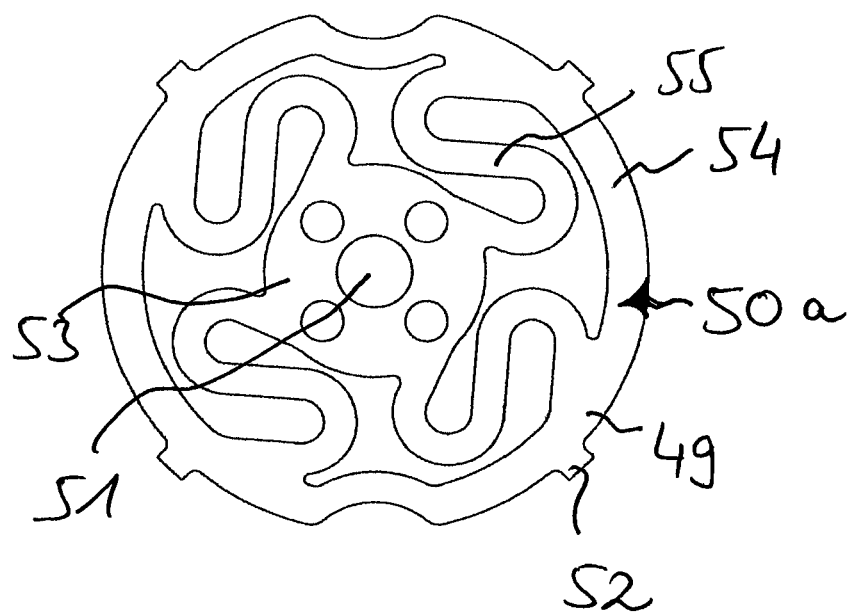
FIG. 3 a flat top view of a guide member arranged between the mobile and fixed part from FIGS. 1 and 2.

At its end regions, the linear body 11 is connected to the respective other part 30, 20 either as a mobile part 20 (FIG. 1) or as a fixed part 30 (FIG. 2) respectively via a guide member 50a, 50b; the guide member 50a is shown as a flat spring 49 in the FIG. 3 in detail. The displacement element 40 driven by the drive 10 via the coils 41 and the permanent magnets 42 is respectively connected to the mobile part 20 (linear body 11 in FIG. 1 and mounting 12 in FIG. 2); its movement carries out the strokes of the pump 1; at the same time, it limits the working chamber 4 of the pump 1 with the inner walls of the pump head 5. A spring 26 can be arranged between the mobile part 20 and the fixed part 30, which, as a compression spring, impinges the mobile part 20 in the direction of the pump head 5 so that, in the de-energized state of the coils 41, the working chamber 4 of the pump can be sealed by the displacement element 40.

Both in FIG. 1 and FIG. 2, in any case, the mobile part 20 and the fixed part 30 can be connected or are connected to each other by at least one guide member 50a, 50b.

In FIGS. 1 and 2, dashed contours can each be recognized, which show the progression of a related contour of a linear body 11, a mounting 12, a displacement element 40, an outer permanent magnet 42 and guide members 50a, 50b, the specific contour of which is shown in the corresponding figure respectively on the end of the aspiration stroke, in the other extreme position of the pressure stroke. Based on the dashed contour in the other extreme position, it can also be recognized that, due to the protruding edge 3 of the opening of the feed 6, the displacement element 40 is capable of sealing the inlet 6 and/or outlet 8 of the working chamber 4 in the de-energized state of the coils 41.

The guide members 50a, 50b designed as flat springs 49 are thereby illustrated in FIGS. 1 and 2 deflected in reverse respectively so that the guide members 50a, 50b can bring the mobile part 20 and, moreover, the displacement element back into the extreme position of the pressure stroke again respectively due to their preload. Instead of the guide members 50a, 50b or for their support, this return process can be taken over by the spring 26.

Both in FIG. 1 as well as in FIG. 2, it can be recognized that the measurement and control unit 45 is electrically connected to the coils 41 to be energized that are connected to each other in series on the beginning and end or each individually, the said measurement and control unit 45, at the same time, having a connection to the sensor 46 designed as a Hall sensor. By the alternating winding direction of the coils 41, in the case of serial energization, alternating current directions result within the coils 41. Due to the additional magnetic flux which is generated by the permanent magnets 42 and introduced into the coils 41 via magnetic poles 24, a relative force (Lorentz force) respectively results in the axial direction of the drive 10 between the magnetic poles 24 and the coils 41; the emerging forces sum up in the case of a plurality of coils 41.

In FIG. 3, a guide member 50a can be recognized, which is provided with an approximately circular cross section, the middle recess 51 of which is provided to receive the respective linear body 11, on which the guide member(s) 50a, 50b are set in an axial manner in their inner region 53 while the edge region 54 of which is at least connected to the respective mounting 12 at evenly spaced projections 52. The edge region 54 and interior region 53 are connected to each other by a plurality of curved spring elements 55, which cause the preload force of the flat spring 49 as a spring element 50a, 50b. The force vector of this preload force (not shown) coaxially points toward the linear body 11 (also not shown) into the drawing plan or from this out so that the edge region 54 and the inner region 53 of the flat spring have a different height level.

Accordingly, the presently described invention relates to a pump 1, in particular, an oscillating positive displacement pump, preferably a diaphragm pump, with at least one mobile part 20, which is arranged in a movable manner relative to a fixed part 30, wherein the mobile part 20 is driven and drives a displacement element 40 of the pump 1 itself, wherein the drive 10 is formed by an electrodynamic drive. In order to create a pump 1 with an electrodynamic drive, which has a very direct response behavior, which can carry out a stroke for the displacement element 40 of the pump 1 in both directions by an electrical control system and which is energy-efficient, a plurality of coils 41 and permanent magnets 42 are provided on the drive 10 and the plurality of coils 41 or the plurality of permanent magnets 42 are respectively arranged on the mobile part 20 of the drive 1 and at least one guide member 50a, 50b is provided on the drive 10, which allows the mobile part 20 to move along only one degree of translation freedom.

The oscillating positive displacement pump 1 designed here as a diaphragm pump comprises a measurement and control unit 45 with a data storage and data processor, which processes a position signal of the mobile part as a measured variable and the strength of the drive current as a measured and/or control variable. The pressure in the working chamber of the positive displacement pump 1 is determined from the calculable and subsequently known transmission behavior of the diaphragm by the parameters 'position' and 'current (force)'. In order to determine the pressure in the working chamber 4 of the pump 1, the development of the electrical current over time and the position of the drive 10 is detected as a measured variable and evaluated in order to then determine and to save the pressure in the working chamber 4 based on the calculable transmission behavior. Thereby, the transmission behavior of the diaphragm serving as the displacement element 40 can be described using the formula $p=c_1F+c_2x$, wherein, in this formula, p is the pressure in the working chamber of the at least one positive displacement pump 1, F is the connecting-rod force and x is the stroke or the position of the working diaphragm and the constants $c_1$ and $c_2$ depend on the geometry and the material characteristics of the working diaphragm. In turn, these constants $c_1$ and $c_2$ can be determined by the outer clamping radius a as well as the inner clamping radius b of the diaphragm, by the diaphragm thickness and the E-modulus E as well as the Poisson's ratio nu. The transmission behavior of the diaphragm can be recalculated for a plurality of positions and load cases by a numerical calculation method, for example, by a finite-difference or a finite-element method, wherein the values are stored in a table as reference values. Using these values or the interpolations lying in between, the respectively "right" transmission behavior is then determined for calculating the pressure in the working chamber. The measurement and control unit 45, in which the pressure values are stored in a table for a number of positions and load cases, compares the actual and reference values in order to then deduce the transmission behavior between the pressure and the connecting-rod force.

REFERENCE NUMBERS 1 pump
3 protruding edge of the inlet
4 working chamber
5 pump head
6 inlet
7 inlet valve
8 outlet
9 outlet valve
10 drive
11 linear body
12 mounting
20 mobile part
21 connecting rod
22 rod
23 shell-shaped part
24 pronounced magnetic pole
25 clear cross section
26 spring
30 fixed part
31 housing
40 displacement element (diaphragm)
41 coil
42 permanent magnet
45 measurement/control unit
46 position sensor (Hall sensor)
49 flat spring
50a, b guide member
51 middle recess
52 projection
53 inner region
54 edge region
55 spring element

The invention claimed is:

1. An oscillating positive displacement pump (1), comprising
at least one mobile part (20), which is arranged to be moveable relative to a fixed part (30)
a drive (10) that drives the at least one mobile part to drive a displacement element (40) of the positive displacement pump (1),
the drive (10) has a plurality of energized coils (41) and permanent magnets (42), and the plurality of coils (41) or the plurality of permanent magnets (42) are arranged on the mobile part (20) of the drive (10) respectively,
magnetic fields with an alternating direction are adapted to flow through the plurality of coils (41) upon energization, the plurality of coils having alternating winding directions, said magnetic fields being generated by the plurality of permanent magnets (42) due to an alternating polarization and being conducted into the coils (41) via magnetic poles (24),
each one of said plurality of coils (41) upon energization is adapted to contribute a summable contribution to a force arising by this in an axial direction of the drive (10),
at least one guide member (50a, 50b) is provided on the drive (10), which permits the mobile part (20) to move along only one degree of translation freedom,
a measurement and control unit (45) with a data storage and data processor which is adapted to receive and process a position signal of the mobile part (20) and a strength of a drive current as at least one of a measured or control variable,
wherein the positive displacement pump (1) is a diaphragm pump and the displacement element (40) is a diaphragm and the drive (10) is an electrodynamic drive free of pole pieces on the coils.

2. The pump as claimed in claim 1, wherein the pump (1) is a diaphragm fluid pump.

3. The pump as claimed in claim 1, wherein the at least one guide member (50a, 50b) is a sliding guide or a spring element (55).

4. The pump as claimed in claim 1, wherein the drive (10) comprises a linear body (11) and a mounting 12, which are arranged in a movable manner against each other, the linear body (11) is a rod (21), and the mounting (12) is a shell-shaped part (23), into an interior space (25) of which the rod (21) protrudes.

5. The pump as claimed in claim 4, wherein the linear body (11) is provided with the permanent magnets (42) with an alternating polarity and the shell-shaped part (23) is provided with the plurality of coils (41).

6. The pump as claimed in claim 4, wherein the linear body (11) forms the at least one mobile part (20) and the mounting (12) forms the fixed part (30).

7. The pump as claimed in claim 1, wherein the fixed part (30) is permanently connected to a housing (31) of the drive (10) or is connected as a single piece with the housing of the drive.

8. The pump as claimed in claim 1, wherein the mobile part (20) and the fixed part (30) are connectable to each other by the at least one guide member (50a, 50b).

9. The pump as claimed in claim 1, wherein the at least one guide member (50a, 50b) comprises at least two of the guide members (50a, 50b) that connect regions of the mobile and fixed part (20, 30) facing each other to each other.

10. The pump as claimed in claim 9, wherein one of the guide members (50a, 50b) is integrated into the displacement element (40) or forms the displacement element (40).

11. The pump as claimed in claim 1, wherein the at least one guide member (50a, 50b) is provided with a preload, which is applied to the displacement element (40) with a de-energized drive (10) in such a way that at least one of an inlet or an outlet opening of a working chamber (4) of the pump (1) is sealed.

12. The pump as claimed in claim 1, further comprising a spring (26) on the drive (10) that impinges the mobile part (20), such that the displacement element (40) with a de-energized drive seals at least one of an inlet or an outlet opening of a working chamber (4) of the pump (1).

13. The pump as claimed in claim 1, wherein the plurality of coils (41) and permanent magnets (42) are arranged in a row respectively.

14. The pump as claimed in claim 1, wherein the pump (1) comprises an essentially cylindrical or square pump head (5), one end region of which is provided with an inlet (6) and an outlet (8) for a fluid to be transported and continues into a housing (31) receiving the drive (10) in an essentially flush manner on the end region.

15. The pump as claimed in claim 1, further comprising a position sensor (46) incorporated in a region of the drive (10).

16. The pump as claimed in claim 15, wherein the position sensor (46) comprises a Hall sensor.

17. The pump as claimed in claim 1, wherein the measurement and control unit (45) is programmable such that the pump (1) with the drive (10) is configurable with work steps for aspiration and discharge of a medium to be transported.

18. An arrangement of a plurality of pumps (1), each as claimed in claim 1 to form a pump system with a number of working chambers (4) corresponding to a number of pumps (1), inlet and outlets of said working chambers being connected to each other in parallel respectively.

19. A method for operating a pump system with at least one positive displacement pump (1) as claimed in claim 1, comprising:
associating the measurement and control unit (45) which includes the data storage and data processor with the at least one positive displacement pump (1),
detecting and evaluating a development of an electrical current over time and a position of the drive (10) of the at least one pump (1) as a measured variable to determine a pressure in a working chamber (4) of the system associated with the at least one pump (1), and
saving the determined pressure in the working chamber (4) with a calculable transmission behavior of the displacement element (40).

20. The method as claimed in claim 19, wherein the transmission behavior of a diaphragm serving as the displacement element (40) is described using the formula $p=c_1F+c_2x$, wherein p is the pressure in the working chamber, F is a connecting-rod force, x is a position of the drive and constants $c_1$ and $c_2$ are dependent on a geometry and material characteristics of the diaphragm.

21. The method as claimed in claim 20, wherein the transmission behavior of the displacement element (40) is described using the formula $p=f(F,x)$ and thereby, the pressure in the working chamber (4) is described as a function of the connecting-rod force and the position of the drive (10) in a numeric manner.

22. The method as claimed in claim 19, wherein the pump system with the measurement and control unit (45) forms a control circuit, which is operated with the drive current strength and the position of the mobile part as a measured variable and with the pressure of the working chamber (4) as a control variable.

23. The method as claimed in claim 19, wherein the pressure is determined individually in both transfer directions of the pump (1) during aspiration and discharge of the medium to be transported.

24. The method as claimed in claim 19, wherein the pressure of a plurality of the pumps (1) associated with the pump system is determined, and the method further comprising separately regulating each of the pumps (1).

25. The method as claimed in claim 19, further comprising the measurement and control unit (45) compensating for developments of the pressure deviating from saved transmission profiles by manipulating the drive (10).

26. The method as claimed in claim 19, further comprising saving the transmission behavior of the diaphragm as a reference value table, determined by a finite element simulation for a number of positions and load cases and determining the transmission behavior to calculate the pressure from stored reference values and interpolations lying in between these values.

27. The method as claimed in claim 19, further comprising, determining a progression over time of the pressure for different speeds at an inlet and outlet (6, 8) of a medium to be transported from the working chamber (4) is determined by the measurement and control unit (45) and determining parameters of at least one of the medium or at least one transport device from said progression over time using an evaluation unit.

* * * * *